United States Patent
Park et al.

(10) Patent No.: US 9,711,278 B2
(45) Date of Patent: Jul. 18, 2017

(54) WIRELESS POWER TRANSMISSION SYSTEM FOR FREE-POSITION WIRELESS CHARGING OF MULTIPLE DEVICES

(71) Applicant: KOREA ELECTROTECHNOLOGY RESEARCH INSTITUTE, Changwon (KR)

(72) Inventors: Young Jin Park, Seoul (KR); Jin Wook Kim, Ansan (KR); Kwan Ho Kim, Seoul (KR); Jong Ryul Yang, Seoul (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 0 days.

(21) Appl. No.: 14/406,993

(22) PCT Filed: Oct. 17, 2013

(86) PCT No.: PCT/KR2013/009280
§ 371 (c)(1),
(2) Date: Dec. 10, 2014

(87) PCT Pub. No.: WO2014/109460
PCT Pub. Date: Jul. 17, 2014

(65) Prior Publication Data
US 2015/0302983 A1    Oct. 22, 2015

(30) Foreign Application Priority Data

Jan. 9, 2013   (KR) ........................ 10-2013-0002460
Jul. 3, 2013   (KR) ........................ 10-2013-0077561

(51) Int. Cl.
*H02J 7/00*   (2006.01)
*H02J 5/00*   (2016.01)
(Continued)

(52) U.S. Cl.
CPC ......... *H01F 38/14* (2013.01); *H01F 27/2804* (2013.01); *H01F 27/2823* (2013.01);
(Continued)

(58) Field of Classification Search
CPC .. H01F 38/14; H01F 27/2823; H01F 27/2804; H02J 17/00; H02J 5/005; H02J 7/025
(Continued)

(56) References Cited

U.S. PATENT DOCUMENTS 4,362,993 A * 12/1982 Young .................... G01N 33/34
324/309
4,816,962 A * 3/1989 Yamada ............. G01R 33/3815
335/216

(Continued)

FOREIGN PATENT DOCUMENTS

JP    2012-110080 A    6/2012
KR    10-2008-0088795 A    10/2008
(Continued)

OTHER PUBLICATIONS

Shen et al., "Uniform Magnetic Field of the Planar Coil with New Winding Structure for Displacement-Insensitive WPT", 2014, IEEE International Conference on Communication Problem-Solving (ICCP), Conference Digest, pp. 394-396.*
(Continued)

*Primary Examiner* — Sun Lin

(57) ABSTRACT

The present invention relates to a near-field wireless power transfer system capable of having a constant efficiency regardless of a charging position of a receiver by only using a simple impedance matching circuit without using a separate existing complex adaptive impedance matching circuit or control circuit, and simultaneously transmitting power without having difficulty with impedance matching even for wireless power transmission to a plurality of electronic (Continued)

devices by applying a wireless power transmitter with a transmitting coil having a structure to generate a uniform mutual inductance between the transmitting coil of the wireless power transmitter and a receiver coil of each of the plurality of electronic devices.

39 Claims, 15 Drawing Sheets

(51) Int. Cl.
  *H02J 17/00* (2006.01)
  *H01F 38/14* (2006.01)
  *H01F 27/28* (2006.01)
  *H02J 7/02* (2016.01)
  *H02J 50/12* (2016.01)

(52) U.S. Cl.
  CPC .............. *H02J 7/025* (2013.01); *H02J 17/00* (2013.01); *H02J 50/12* (2016.02); *H01F 2027/2809* (2013.01)

(58) Field of Classification Search
  USPC ........................................................ 320/108
  See application file for complete search history.

(56) References Cited

U.S. PATENT DOCUMENTS

| | | | | |
|---|---|---|---|---|
| 6,181,227 | B1* | 1/2001 | Schmidt | G01R 33/385 324/318 |
| 7,394,255 | B2* | 7/2008 | McDougall | G01R 33/3808 324/319 |
| 7,952,454 | B2* | 5/2011 | Aubert | G01R 33/3815 335/216 |
| 9,106,083 | B2* | 8/2015 | Partovi | H02J 7/025 |
| 9,252,604 | B2* | 2/2016 | Kim | H02J 7/0024 |
| 9,270,342 | B2* | 2/2016 | Kasturi | H04B 5/0087 |
| 2005/0208817 | A1 | 9/2005 | Dayan et al. | |
| 2012/0235636 | A1* | 9/2012 | Partovi | H02J 7/025 320/108 |

FOREIGN PATENT DOCUMENTS

| | | |
|---|---|---|
| KR | 10-2012-0049017 A | 5/2012 |
| WO | WO 2012/101907 A1 | 8/2012 |

OTHER PUBLICATIONS

Casanova et al., "Transmitting Coil Achieving Uniform Magnetic Field Distribution for Planar Wireless Power Transfer System", 2009, IEEE Radio and Wireless Symposium, Conference Digest, pp. 530-533.*
Casanova et al., "A Lossely Coupled Planar Wireless Power System for Multiple Receivers", Aug. 2009, IEEE Transactions on Industrial Electronic, vol. 56, No. 8, pp. 3060-3068.*
Diao et al., "Design of Coil Structure Achieving Uniform Magnetic Field Distribution for Wireless Charging Platform", Jun. 2011, IEEE 4$^{th}$ International Conference on Power Electronics Systems and Applications (PESA), paper pp. 1-5.*
Ogawa et al., "A Study of Efficiency Improvement of Wireless Power Transfer by Impedance Matching", 2012, IEEE MTT-S International Microwave Workshop Series on Innovative Wireless Power Transmission: Technologies, Systems, and Applications (IMWS), Conference Digest, pp. 155-157.*
Lee et al., "Magnetic Resonant Wireless Power Delivery for Distributed Sensor and Wireless Systems", 2012, IEEE Topical Conference on Wireless Sensors and Sensor Networks (WiSNet), Conference Digest, pp. 13-16.*
Ricketts et al., "Tri-Loop Impedance and Frequency Matching with High-Q Resonators in Wireless Power Transfer", 2014, IEEE Antennas and Wireless Propagation Letters, vol. 13, pp. 341-344.*
Chen et al., "Analysis of the Double-Layer Printed Spiral Coil for Wireless Power Transfer", Jun. 2013, IEEE Journal of Emerging and Selected Topics in Power Electronics, vol. 1, No. 2, pp. 114-121.*
International Search Report for PCT/KR2013/009280 filed on Oct. 17, 2013.

* cited by examiner

Tx coil    Rx coil

PROPOSED COIL(TX COIL)

RX SELF-
RESONANT COIL

RX SELF-
RESONANT COIL

RX SELF-
RESONANT COIL

WIRELESS POWER TRANSMISSION SYSTEM FOR FREE-POSITION WIRELESS CHARGING OF MULTIPLE DEVICES

TECHNICAL FIELD

The present invention relates generally to a near-field wireless power transfer system and, more particularly, to a near-field wireless power transfer system using a structure in which wireless power transmitter and receiver have uniform mutual inductance therebetween.

BACKGROUND ART

FIG. 1 illustrates an equivalent circuit of a typical electromagnetic induction-type wireless power transfer system using respective resonant coils of a transmitter and a receiver. When the self-inductance, resistance, and capacitance for resonance of a transmitting coil (Tx coil) are $L_1$, $R_1$, and $C_1$, respectively, and the self-inductance, resistance, and capacitance for resonance of a receiving coil (Rx coil) are $L_2$, $R_2$, and $C_2$, respectively, the power of the Tx coil that receives an Alternating Current (AC) source Vs may be transferred to a load (impedance $Z_L$) connected to the Rx coil depending on magnetic coupling based on mutual inductance $M_{12}$. The load may include a rectifying circuit, DC-DC converter, a controlling circuit, a battery charger, etc. A power transmission unit including the Tx coil is provided in a transmitter for power transmission, and a power reception unit including the Rx coil is provided in various types of electronic devices that consume power, such as a smart phone and an iPad. An electronic device may be located close to the power transmission unit and allow power to be supplied to the load of the electronic device in a wireless manner through the Rx coil of the electronic device.

However, in the wireless power transfer system, the intensity of magnetic coupling between the above-described Tx and Rx coils varies with the structures, geometrical arrangement, and positions of the Tx and Rx coils and a distance between the Tx and Rx coils. When the intensity of magnetic coupling between the transmitting and receiving coils varies depending on various environmental changes, the optimal power transfer condition of a wireless power transfer system changes. Thus, complexity is required in such a way that an additional impedance matching circuit is provided in the transmitter or receiver to satisfy the condition of the maximum power transfer, or a current voltage sensing circuit or the like is provided so as to control the optimal power transfer condition. In particular, when a plate-type transmitter is used, optimal impedance matching between the transmitter and the receiver must be realized depending on the position of the receiver placed on a plate, and thus a problem arises in that it is difficult to support wireless power transmission at a free position (free positioning) between the transmitter and the receiver. Further, when mutual inductance between the transmitting and receiving coils differs for each position, or when multiple devices are located at different positions to receive power, a problem arises in that it is difficult for the transmitter to perform impedance matching to respective devices for different impedances, thus making it impossible to simultaneously support power transmission to multiple devices.

In relation to conventional wireless power transmission technology for maximum power transfer between a transmitter and a receiver, various documents are published, and the following four documents among the documents are introduced below.

(1) A. Kurs, A. Karalis, R. Moffatt, J. D. Joannopoulos, P. Fisher, and M. Soljacic, "Wireless power transfer via strongly coupled magnetic resonances", Science, vol. 317, pp. 83-86, July 2007.

(2) J. Park, Y. Tak, Y. Kim, Y. Kim, S. Nam, "Investigation of adaptive matching methods for near-field wireless power transfer", IEEE Transactions on Antennas and Propagation, vol. 59, pp. 1769-1773, May 2011.

(3) W. S. Lee, H. L. Lee, K. S. Oh, and J. W. Yu, "Uniform magnetic field distribution of a spatially structured resonant coil for wireless power transfer", Applied physics Letters 100, 2012.

(4) W. S. Lee, W. I. Son, K. S. Oh, and J. W. Yu, "Contactless energy transfer systems using antiparallel resonant loops", IEEE transactions on industrial electronics, Vol. 60, No. 1, January 2013.

In the above document (1), a maximum power transfer condition that varies with a change in distance has been satisfied by additionally using transmission/reception coupling coils in addition to transmission/reception resonant coils. However, this method is problematic in that it is difficult to apply such a method to a limited space when the limited space is used because the added transmitting/receiving coupling coils must be physically moved.

The above document (2) discloses a configuration that uses the splitting of transmission/reception penetration characteristics appearing while coupling changes according to the distance, as a method of tracking an optimal frequency so as to transfer the maximum power according to the distance between the transmitting/receiving resonant coils. However, there is a problem in that, when the frequency for near-field wireless power transfer is fixed, it is difficult to use such a frequency tracking method.

The above document (3) proposes a structure of having a uniform magnetic field distribution at a predetermined height of a rectangular coil by bending the rectangular coil, but it is disadvantageous in that the shape of the coil must be mechanically deformed. Also, there is a disadvantage in that, unless the receiver has a uniform magnetic field, uniform mutual inductance or a uniform figure of merit cannot be obtained.

The above document (4) discloses a method for maintaining mutual inductance that varies according to the distance between transmitting and receiving coils by utilizing two series-connected loop coils through which currents flow in opposite directions. This may be utilized only when the central axes of transmitting/receiving coils are aligned with each other, but it is difficult to freely position a receiver on a plate-shaped transmitter, and it is also difficult to charge multiple receivers placed on the transmitter in a wireless manner.

DISCLOSURE

Technical Problem

The present invention has been made keeping in mind the above problems, and an object of the present invention is to provide a near-field wireless power transfer system, which utilizes a structure having a uniform Figure of Merit (FoM), that is, uniform mutual inductance, between a wireless power transmitter and a wireless power receiver, thus obtaining uniform efficiency regardless of the charging position of the receiver using only a simple impedance matching circuit without separately using a complicated adaptive impedance matching circuit or control circuit as in the case of a conventional scheme, and thus simultaneously transmitting power without undergoing difficulty in impedance matching even for wireless power transmission to multiple electronic devices.

Technical Solution

First, when the characteristics of the present invention are summarized, a coil structure for wireless power transmission in accordance with an aspect of the present invention includes a coil part through which current flows in a direction of input current applied from a first end of the coil structure, the coil part being disposed between the first end and a second end of the coil structure; and a coil part connected to the coil part through which current flows in the direction of the input current, the coil part being concentrically formed with the coil part and configured such that current flows in a direction opposite to that of the input current, wherein the coil structure transfers wireless power depending on mutual inductance with respective target coils, relative center positions of which are horizontally different from each other.

The target coil may include either a single coil, a relative center position of which is horizontally movable, or multiple coils, relative center positions of which are located at horizontally different positions.

For each target coil, the coil structure may be configured to have uniform mutual inductance within a preset range.

The coil structure may be configured such that a magnetic field in a center portion of the coil structure is relatively increased to have uniformity in mutual inductance with another coil.

Coils constituting the coil structure may be formed using a Printed Circuit Board (PCB) manufacturing process or a semiconductor manufacturing process, and coils formed to be distributed and arranged on multiple layers are connected to each other through via holes.

Respective coil parts of the coil structure may be wound in shapes of concentric circles or concentric polygons.

The coil part through current flows in the direction of the input current may include a coil part concentrically wound multiple times towards a center thereof so that current flows in the direction of the input current.

The coil part through which the current flows in the direction opposite to that of the input current may include a coil part in which two or more coils are connected in parallel and wound so that current flows in a direction opposite to that of the input current.

The coil part in which two or more coils are connected in parallel and wound may be wound one or more times.

Further, in accordance with another aspect of the present invention, there is provided a coil structure includes a coil part through which current flows in a direction of input current applied from a first end of the coil structure, the coil part being disposed between the first end and a second end of the coil structure, wherein the coil part includes a first coil part concentrically wound one or more times towards a center thereof so that current flows in a direction of the input current; and a second coil part, a center of which is aligned with that of the first coil part and in which two or more coils are connected in parallel and are concentrically wound so that current flows in the direction of the input current, and wherein the coil structure transfers wireless power depending on mutual inductance with respective target coils, relative center positions of which are horizontally different from each other.

The second coil part in which two or more coils are connected in parallel and are concentrically wound may be wound one or more times.

The coil structure may further include a third coil part in which two or more coils are connected in parallel and are concentrically wound so that current flows in a direction opposite to that of the input current.

The second coil part may be arranged in a center portion or an outermost portion of the coil structure.

In according to a further aspect of the present invention, there is provided a wireless power transfer system for transmitting/receiving power between a transmitting coil of a transmitter and a receiving coil of a receiver via magnetic coupling, wherein the transmitting coil or the receiving coil includes a first coil part concentrically wound one or more times towards a center thereof so that current flows in a direction of input current applied from a first end of the transmitting or receiving coil, the first coil part being disposed between the first end and a second end of the transmitting or receiving coil; and a coil part connected to the first coil part in which the current flows in the direction of the input current, the coil part having a center aligned with that of the first coil part and being concentrically arranged with the first coil part, the coil part being configured such that current flows in a direction opposite to that of the input current; or a coil part having a center aligned with that of the first coil part, the coil part being configured such that two or more coils are connected in parallel and are concentrically wound so that current flows in a direction of the input current, wherein the transmitting coil transmits power to one or more receiving coils, relative center positions of which are horizontally different from each other.

Uniform mutual inductance within a preset range may be obtained between each of the receiving coils and the transmitting coil.

The transmitter or the receiver may transfer power using the uniform mutual inductance, without changing impedance matching.

The transmitter may include means for impedance matching to the transmitting coil between an Alternating Current (AC) source (Vs) and the transmitting coil.

The transmitter may include a source coil connected to the AC source that is a voltage source, current source, power source, etc. and coupled to the transmitting coil via a time-varying magnetic field without being directly connected electrically to the transmitting coil, and perform impedance matching via mutual inductance between the source coil and the transmitting coil.

The wireless power transfer system may further include a capacitor arranged between a first end of the AC source and a first end of the source coil. The capacitance of the capacitor may be variable depending on the impedance variation and/or the number of the loads.

The transmitter may include a transformer for impedance matching, a primary side of which is connected to an AC source that is a voltage source, current source or power source, and a secondary side of which is connected to the transmitting coil.

The transmitter may include a capacitor for impedance matching connected between the transmitting coil and an AC source that is a voltage source, current source, or a power source.

The transmitter may include an inductor for impedance matching connected between the transmitting coil and an AC source that is a voltage source, current source, or power source. The inductance of the inductor may be variable depending on the impedance variation and/or the number of the loads.

The receiver may include means for impedance matching for a load, the means being arranged between the receiving coil and the load.

The receiver may include a load coil connected to a load and coupled to the receiving coil via a time-varying magnetic field without being directly connected to the receiving coil, and perform impedance matching via mutual inductance between the receiving coil and the load coil.

The receiver may further include a capacitor arranged between a first end of the load coil and a first end of the load.

The receiver may include a transformer for impedance matching, a primary side of which is connected to the receiving coil and a secondary side of which is connected to a load.

The receiver may further include a capacitor arranged between a first end of the secondary side and a first end of the load.

The receiver may include an inductor for impedance matching connected between a load and the receiving coil.

The receiver may include a capacitor for impedance matching connected between a load and the receiving coil.

The wireless power transfer system may further include a capacitor arranged between a first end of the inductor and a first end of the load.

The transmitter may include a sensing circuit for sensing a variation in loads (for example, the magnitude or the phase of the voltage or the current) depending on a number of receiving coils, and perform impedance matching by controlling the means for impedance matching so that input impedance is adjusted depending on the variation in the loads sensed by the sensing circuit.

In accordance with yet another aspect of the present invention, there is provided a wireless power transmission method, including transmitting, by a transmitting coil, power in a wireless manner by using an AC source; and receiving, by a receiving coil via magnetic coupling, the power in a wireless manner, wherein the transmitting coil or the receiving coil includes a first coil part concentrically wound one or more times towards a center thereof so that current flows in a direction of input current applied from a first end of the transmitting or receiving coil, the first coil part being disposed between the first end and a second end of the transmitting or receiving coil; and a coil part connected to the first coil part in which the current flows in the direction of the input current, the coil part having a center aligned with that of the first coil part and being concentrically arranged with the first coil part, the coil part being configured such that current flows in a direction opposite to that of the input current; or a coil part having a center aligned with that of the first coil part, the coil part being configured such that two or more coils are connected in parallel and are concentrically wound so that current flows in a direction of the input current, wherein transmitting the power in the wireless manner is configured such that the transmitting coil transmits power to one or more receiving coils, relative center positions of which are horizontally different from each other.

Advantageous Effects

In accordance with the near-field wireless power transfer system according to the present invention, there is no need to use a circuit for changing impedance matching depending on a change in the position between a transmitter and a receiver, and thus system complexity is decreased, and the system costs are low.

Further, the present invention enables free positioning by which a transmitter and a receiver are freely arranged using a single coil within the range of a wireless power transmission distance or an effective wireless charging range, which has a uniform mutual inductance of 20% or less, without requiring a separate additional circuit.

Furthermore, since uniform mutual inductance is obtained within a wireless power transmission distance having uniform mutual inductance, multiple devices may simultaneously receive wireless power and may provide power for operations of the respective devices or may be charged with power.

BEST MODE

Figure 1:
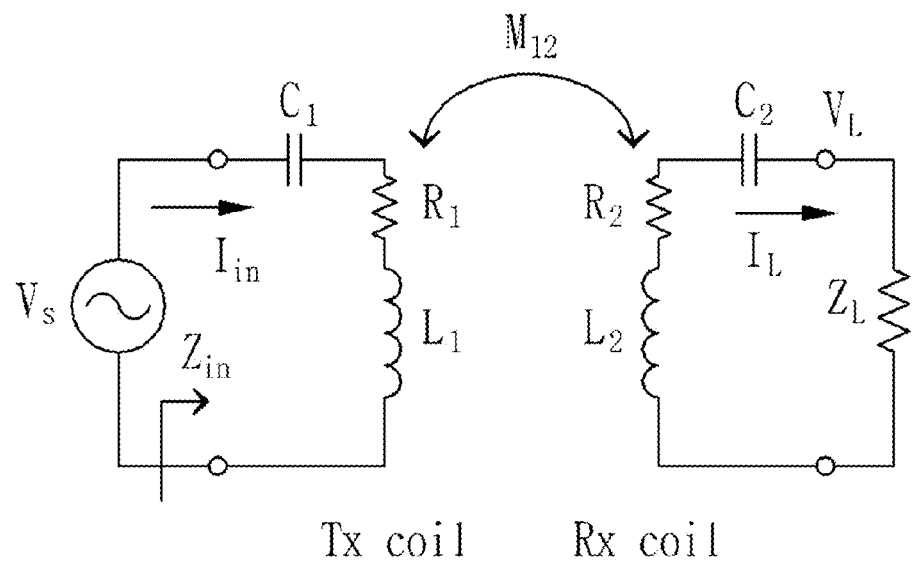
FIG. 1 is an equivalent circuit diagram of a typical electromagnetic induction-type wireless power transfer system that uses respective resonant coils of a transmitter and a receiver.

Preferred embodiments of the present invention will be described in detail with reference to the attached drawings and details described in the drawings. However, the present invention is not limited or restricted by the above embodiments.

Figure 2:
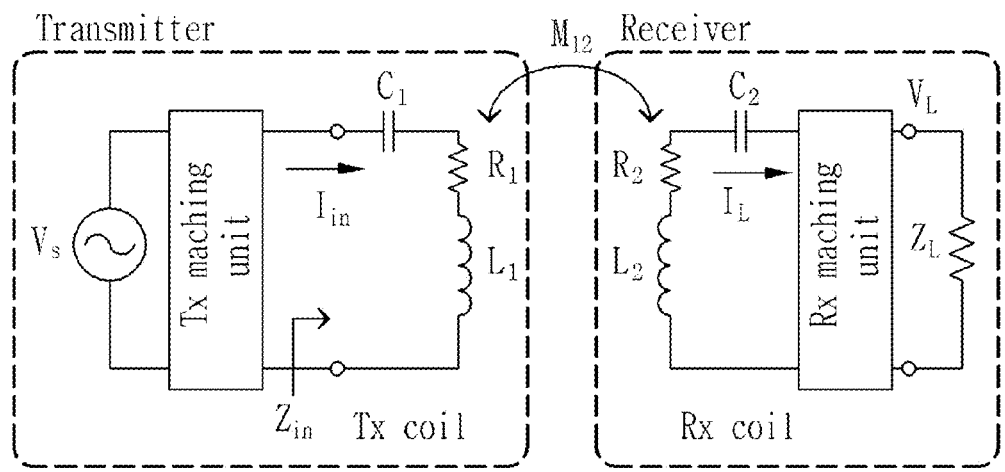
FIG. 2 is a diagram showing the concept of a wireless power transfer system according to an embodiment of the present invention.

FIG. 2 is a diagram showing the concept of a wireless power transfer system according to an embodiment of the present invention.

As shown in FIG. 2, the wireless power transfer system according to the embodiment of the present invention includes matching units (Tx matching unit and Rx matching unit) for impedance matching respectively provided in a transmitter for receiving an AC source (Vs) and a receiver so that the transmitting (resonant) coil (Tx coil, indicated by self-inductance $L_1$, resistance $R_1$, and capacitance $C_1$ for resonance in an equivalent circuit) of the transmitter may transmit the maximum power to the receiving (resonant) coil (Rx coil, indicated by self-inductance $L_2$, resistance $R_2$ and capacitance $C_2$ for resonance in an equivalent circuit) of the receiver via electromagnetic induction or magnetic coupling based on mutual inductance $M_{12}$.

In order to transfer the maximum power, the impedance matching unit of the transmitter (Tx matching unit) must minimize the reflection of a source signal that is transmitted by matching impedance viewed from the Tx coil to input impedance $Z_{in}$ (impedance viewed from a source), and the impedance matching unit of the receiver (Rx matching unit) for obtaining the effect of impedance matching for a load (impedance $Z_L$) must satisfy the condition of conjugate matching of impedance viewed from the Rx coil towards the load.

In this case, when conductance resistance loss caused by the matching unit (Tx matching unit or Rx matching unit) is not present, a maximum power transfer efficiency η (the ratio of power transferred to a load to total transmitted power) may be derived based on well-known electromagnetic theory by the following Equation 1:

$$\eta = \frac{(1+FOM^2)^{\frac{1}{2}} - 1}{(1+FOM^2)^{\frac{1}{2}} + 1} \qquad \text{Equation 1}$$

$$FOM = \frac{(2\pi f_r)M_{12}}{(R_1 R_2)^{\frac{1}{2}}}$$

where FOM denotes the Figure of Merit (FoM) of the transmitting/receiving system. When a coil, which will be described later and which is proposed in the present invention, is used, if $R_1$ in Equation 1 is replaced with $R_p$, the FOM and the maximum power transfer efficiency η may be obtained. Here, $f_r$ denotes the resonant frequency of the Tx coil and the Rx coil, $R_1$ denotes the resistance of the Tx coil, $R_2$ denotes the resistance of the Rx coil, and $M_{12}$ denotes mutual inductance between the Tx and Rx coils. In Equation 1, the resistances of the Tx and Rx coils are scarcely changed due to changes in the positions of the Tx and Rx coils, and thus the efficiency η and the FoM of the system vary according to $M_{12}$.

In the present invention, the transmitter may supply wireless power to the above-described receiver mounted in various types of electronic devices that consume power, such as a smart phone and a tablet such as iPad, at the maximum power transfer efficiency. The transmitter may simply or inexpensively supply wireless power at the maximum power transfer efficiency adaptively to free positioning, as will be described later, within the wireless power transmission range having an FoM of 20% or less or having a uniform mutual inductance $M_{12}$ based on the above-described principle, even if a complicated adaptive impedance matching circuit for supporting the optimal impedance matching is not used depending on changes in the positions of the corresponding transmitter and receiver in which the proposed coil structure of the present invention may be applied to one or more of the Tx coil and the Rx coil when a wireless power transmitter transmits power to a receiver having a spatially fixed or movable load (e.g., a battery, a device operating circuit, etc.). Since the present invention has uniform mutual inductance within a wireless power transmission distance having such uniform mutual inductance, multiple devices may simultaneously receive wireless power, and use the power to charge a battery or operate the devices.

Figure 3:
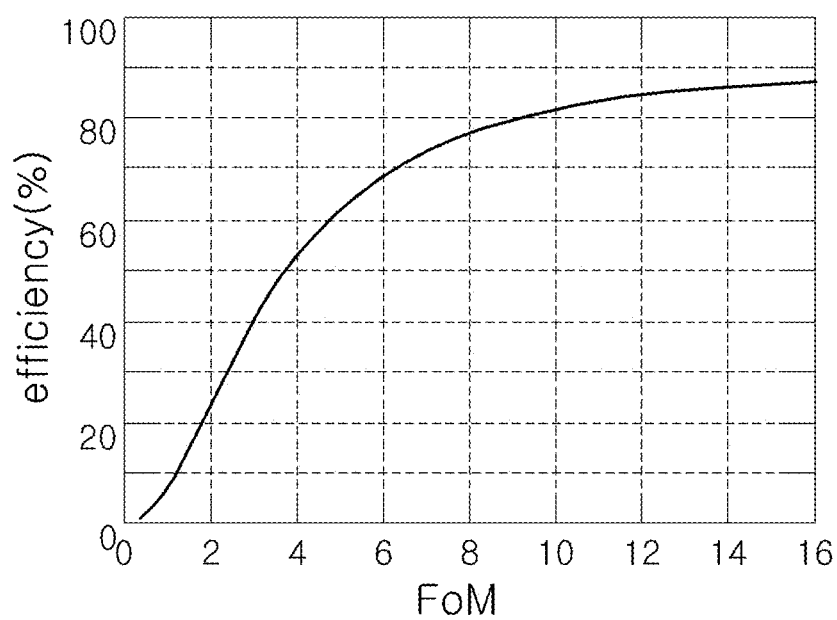
FIG. 3 is a graph showing maximum transmission/reception power transfer efficiency depending on the FOM of the wireless power transfer system according to an embodiment of the present invention.

FIG. 3 is a graph showing the transmission/reception maximum power transfer efficiency η depending on the FoM of the wireless power transfer system according to an embodiment of the present invention. Here, the maximum power transfer efficiency η indicates a case where the Tx and Rx matching units satisfy the above-described maximum power transfer condition. It can be seen that, as shown in FIG. 3, as the FoM increases, efficiency η increases, whereas as the FoM decreases, a variation in the maximum power transfer efficiency η becomes larger with a variation in the FoM.

Figure 4A:
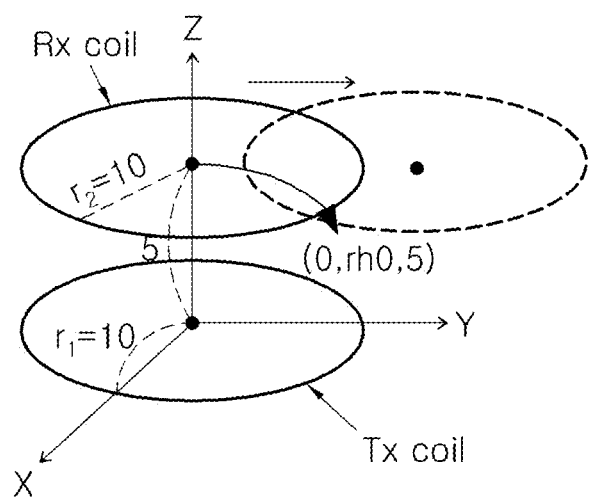
FIGS. 4A and 4B are diagrams showing an example of calculation results of mutual inductance $M_{12}$ between the transmitting and receiving coils in the wireless power transfer system according to an embodiment of the present invention.
Figure 4B:
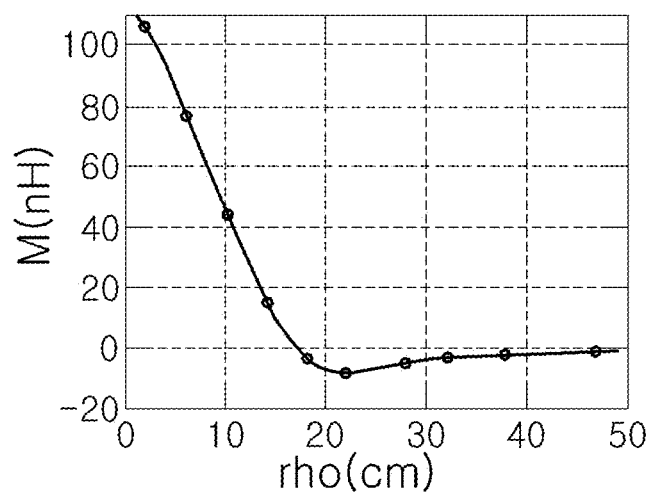

FIGS. 4A and 4B are diagrams showing an example of calculation results of mutual inductance $M_{12}$ between transmitting (Tx) and receiving (Rx) coils in the wireless power transfer system according to an embodiment of the present invention.

FIG. 4A, the Tx coil and the Rx coil are arranged in parallel with each other so that the centers thereof are aligned with each other. Each of the coils having a radius of 10 cm is assumed to be a very thin filamentary coil and to have a number of turns corresponding to 1. All of units of numerals described in the drawing are cm. FIG. 4B illustrates a mutual inductance value appearing when the center of the Rx coil is horizontally moving in a y direction by a movement distance rho in the drawing. Such transmission/reception configuration may generally be an example of a structure in which, when a receiver is placed on a transmitter (e.g., a distance of 5 cm when the centers of the two coils are aligned with each other in the drawing), the receiver is charged in a wireless manner. As shown in the drawing, when the centers of two coils are aligned with each other (y=0), a largest mutual inductance value is exhibited. As rho becomes larger, the mutual inductance value is gradually decreased and then becomes 0 near a position where the difference between the centers is about 17 cm. That is, depending on a change in the relative horizontal positions of the two coils (one coil is moved horizontally along the plane of the coil), the distance between the centers of the two coils changes, and an area in which magnetic fields are coupled changes, thus varying the mutual inductance. For this reason, when the receiver is moving in the actual charging zone of the transmitter, mutual inductance between the Tx and Rx coils varies, so that an optimal power transfer condition changes. Accordingly, Tx/Rx matching units must be designed to satisfy the maximum power transfer condition in order to obtain the maximum power transfer efficiency η according to the position.

Figure 5:
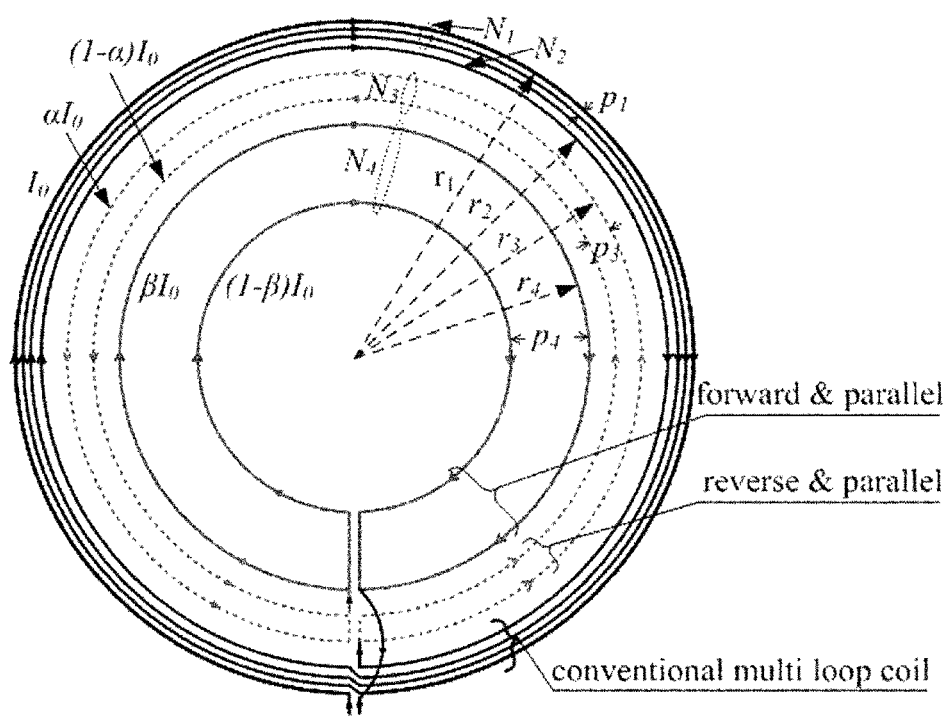
FIG. 5 is a diagram showing an example of a coil structure having electrically uniform mutual inductance according to an embodiment of the present invention.

FIG. 5 is a diagram showing an example of a coil structure according to an embodiment of the present invention to have electrically uniform mutual inductance. Referring to FIG. 5, a coil structure to have uniform mutual inductance according to an embodiment of the present invention is composed of concentrically arranged four parts $N_1$, $N_2$, $N_3$, and $N_4$ having different radiuses $r_1$, $r_2$, $r_3$, and $r_4$ from the identical center.

The outermost coil part $N_1$ is implemented as loop coil (s) that starts at one end of the coil structure for receiving an input current $I_0$ and that is wound one or more times (e.g., three times) at equal intervals ($p_1$) (e.g., see 1.5 mm in the following Table 1) from an outermost radius $r_1$ (e.g., 6.5 cm in the following Table 1), wherein each loop coil of $N_1$ has the same current (forward) direction as that of the input current. Here, although the loop coils wound as the coil part $N_1$ have been described as being at equal intervals by way of example, they are not limited to such an example and may be wound at unequal intervals. The remaining coils $N_2$, $N_3$, and $N_4$ may be respectively implemented as coils wound multiple times, wherein the coils may have the shape of being wound at equal or unequal intervals.

The coil part $N_2$ connected to and extended from the end of the coil part $N_1$ may preferably be a single coil wound to have a radius $r_2$ (e.g., see 6 cm in the following Table 1) smaller than that of the innermost coil of the coil part $N_1$ (according to the circumstances, $N_2$ may have multiple coils). The loop coil(s) of the coil part $N_2$ is spaced apart from the innermost coil among the coils of the coil part $N_1$ by a predetermined interval, which is preferably different from the interval $p_i$ between the coils of the coil part $N_1$ (according to the circumstances, the interval may be identical to the interval $p_1$).

The coil part $N_3$ connected to the end of the coil part $N_2$ is a coil wound to have an outermost radius $r_3$ (e.g., see 5.5 cm in the following Table 1) smaller than the radius $r_2$ inside a circle defined by the radius $r_2$, and is configured such that two coils are connected in parallel with each other at a predetermined interval (e.g., see 5 mm in the following Table 1) (according to the circumstances, three or more coils may be connected in parallel, and the intervals between the coils may be unequal), wherein the coils of the coil part $N_3$ are formed to be wound one or more times so that the current direction of $N_3$ is opposite (reverse) to that of the coil parts $N_1$ and $N_2$.

The coil part $N_4$ connected to the end of the coil part $N_3$ (the end of the two connected coils) is a coil wound to have a radius $r_4$ (e.g., see 4.5 cm in the following Table 1) smaller than the radius of the inner coil of the coil part $N_3$, and may have a shape in which two coils are connected in parallel with each other at a predetermined interval (e.g., 15 mm in the following Table 1) (according to the circumstances, three or more coils may be connected in parallel and the intervals between the coils are unequal), wherein the coil part $N_4$ is formed to be wound one or more times so that the current direction of the coil part $N_4$ is identical to that of the coils of the coil parts $N_1$ and $N_2$. A capacitor Cp may be connected, for adjustment of a resonant frequency or for impedance matching, to a suitable position corresponding to any one of between the end portion of the coil part $N_4$ (the end of two connected coils) and the start portion of the coil part $N_1$, the end portion of the coil part $N_4$, and the start portion of the coil part $N_1$, as shown in FIG. 6.

In FIG. 5, input current $I_0$ applied to the coil part $N_1$ is divided into $\alpha I_0$ and $(1-\alpha)I_0$ at the parallel coils of the coil part $N_3$ and flows through the coils. Similarly, the input current is divided into $\beta I_0$ and $(1-\beta)I_0$ at the parallel coils of the coil part $N_4$ and flows through the coils. $\alpha$ and $\beta$ may be either positive or negative numbers, and the magnitudes of the absolute values thereof are equal to or less than 2. Therefore, in case for N3, the cases of ($\alpha=-1$, $1-\alpha=2$), ($\alpha=1$, $1-\alpha=0$), ($\alpha=0$, $1-\alpha=1$), etc. are possible. These cases may occur because N3 is influenced by the magnetic field resulting from the current flowing in the neighboring coil. In case for N4, the cases of ($\beta=-1$, $1-\beta=2$), ($\beta=1$, $1-\beta=0$), ($\beta=0$, $1-\beta=1$), etc. are possible.

In this way, although, in the proposed coil structure of the present invention, an example in which the respective coil parts are formed in the shape of concentric circles has been described, the coil structure is not limited to such an example and may be formed in the shape of various concentric polygons, such as a rectangular shape or a hexagonal shape, if necessary. Further, an example in which each coil part is formed using a metal conducting wire such as a copper wire has been described, as shown in FIG. 6, but the pattern of each coil part may be formed using various manufacturing processes according to the circumstances, such as a Printed Circuit Board (PCB) manufacturing process or a semiconductor manufacturing process. When such a PCB manufacturing process or semiconductor manufacturing process is used, four coil parts $N_1$, $N_2$, $N_3$, and $N_4$ may be suitably distributed and arranged on multiple layers, such as both surfaces of a given board such as a PCB or a semiconductor wafer, wherein the coil parts formed on the respective layers may be connected to each other through via holes or the like.

Figure 6:
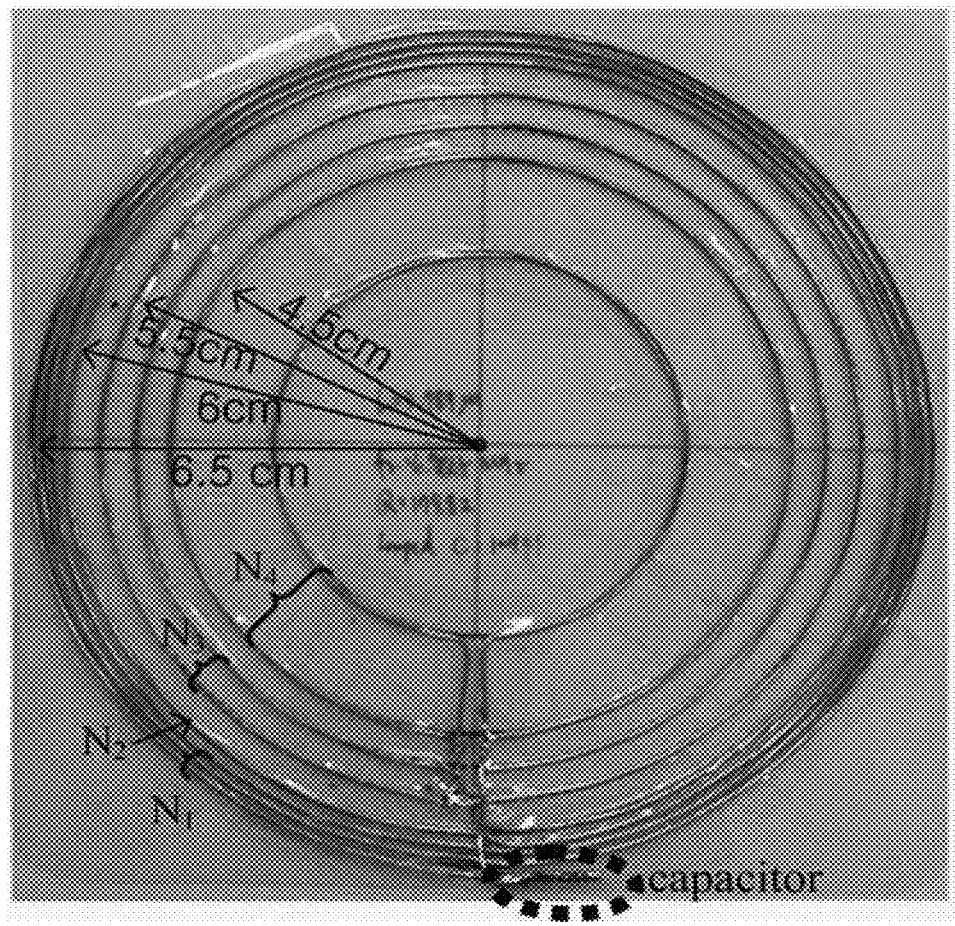
FIG. 6 is a diagram illustrating a coil actually manufactured to have the structure of FIG. 5.

Further, although the arrangement of the respective coils $N_1$, $N_2$, $N_3$, and $N_4$ has been illustratively shown, as shown in FIG. 5 or 6, the arrangement is not limited thereto, and the coils $N_1$, $N_2$, $N_3$, and $N_4$ may be freely arranged without being limited to specific positions. Furthermore, some of the coil parts $N_1$, $N_2$, $N_3$, and $N_4$ may be omitted. In this case, individual coil parts may be suitably connected between one end and the other end of the coil structure, and the coil part $N_4$ may also be arranged in the outermost portion of the coil structure rather than the center portion (innermost portion) thereof as in the case of FIGS. 5 and 6.

TABLE 1

| | Number of Turns | Pitch | Radius | Coil thickness | Direction & connection |
|---|---|---|---|---|---|
| $N_1$ | 3 | 1.5 mm | 6.5 cm | 0.64 mm | Forward & series |
| $N_2$ | 1 | — | 6 cm | 0.64 mm | Forward & series |
| $N_3$ | 2 | 5 mm | 5.5 cm | 0.64 mm | Reverse & parallel |
| $N_4$ | 2 | 15 mm | 4.5 cm | 0.64 mm | Reverse & parallel |

Figure 7:
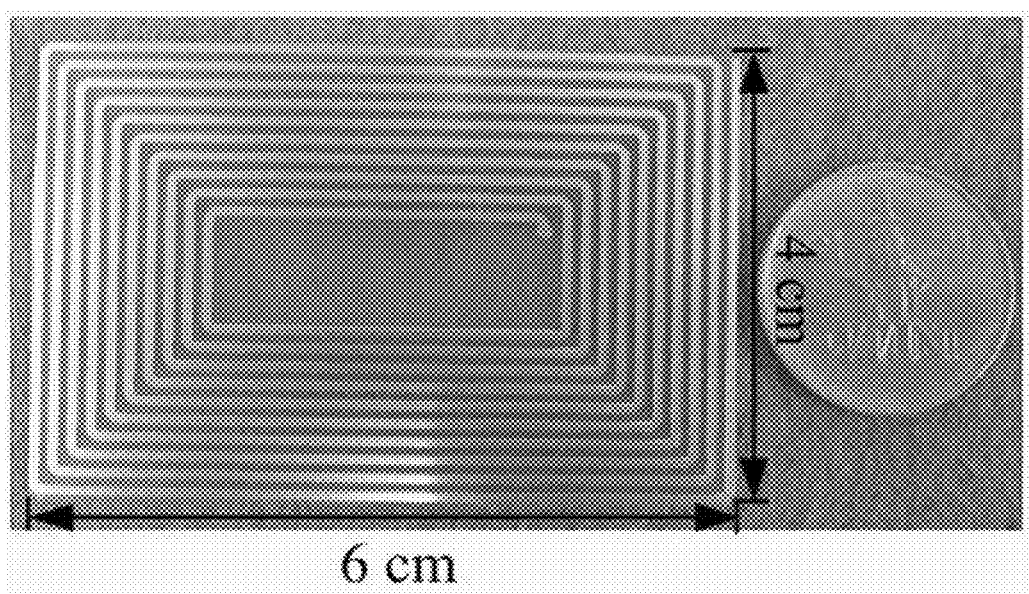
FIG. 7 is a diagram illustrating an actually manufactured receiving coil according to an embodiment of the present invention.

FIG. 7 illustrates an actually manufactured receiving coil (Rx coil) according to an embodiment of the present invention. The Rx coil may be manufactured using a PCB manufacturing process, and the resonant frequency $f_r$ thereof is set to 6.78 MHz. In addition, the Rx coil may also be manufactured using the above-described various methods, such as a method using a thin copper wire or a semiconductor manufacturing process. Such an Rx coil is a single exemplary structure, and the coil structure of the present invention such as that shown in FIG. 5 or 6 may also be applied to the Rx coil. That is, both the transmitting coil (Tx coil) and the receiving coil (Rx coil) may be formed in the shape of the coil structure of the present invention, such as that shown in FIG. 5 or 6. Alternatively, only either the Tx coil or the Rx coil may be formed in the shape of the coil structure of the present invention, such as that shown in FIG. 5 or 6.

Figure 8:
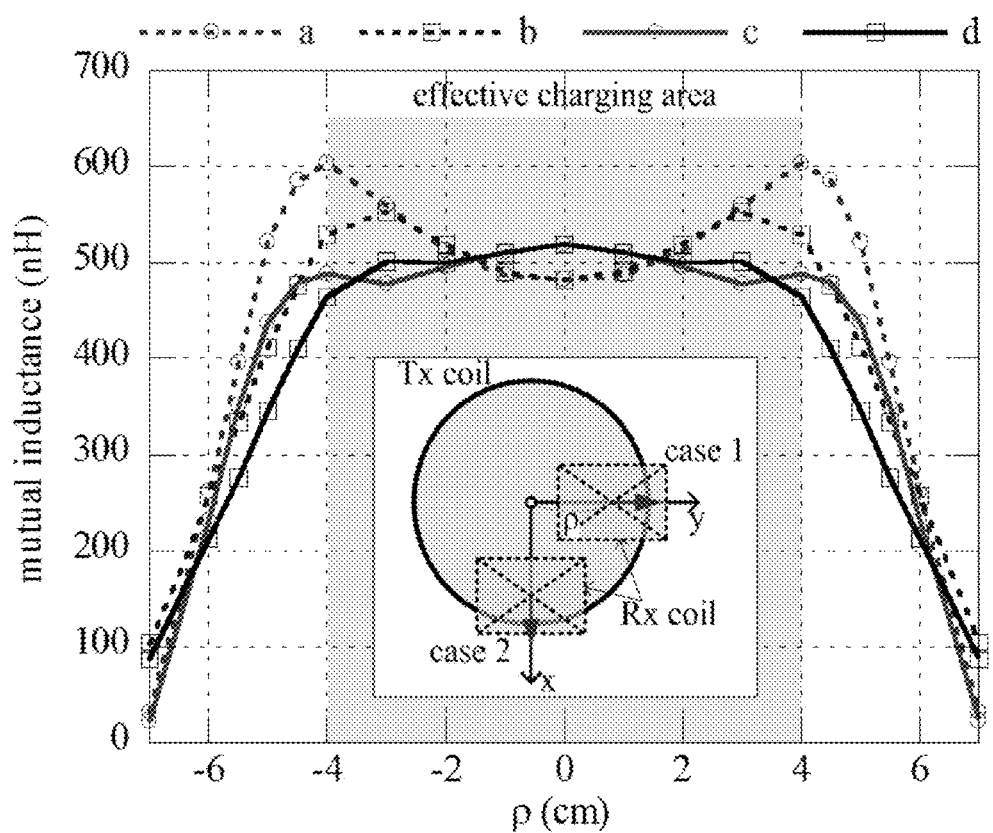
FIG. 8 is a diagram showing the results of measuring mutual inductance between the transmitting and receiving coils of the wireless power transfer system according to an embodiment of the present invention.

FIG. 8 illustrates the measurement results of mutual inductance $M_{12}$ between the transmitting and receiving coils of the wireless power transfer system according to an embodiment of the present invention.

A capacitor Cp may be connected to a suitable position corresponding to any one of between the end portion of the coil part $N_4$ (the end of two connected coils) and the start portion of the coil part $N_1$, the end portion of the coil part $N_4$, and the start portion of the coil part $N_1$, as shown in FIG. 6, so that both the Tx coil and the Rx coil have a resonant frequency of 6.78 MHz.

In FIG. 8, graph a and b indicate mutual inductance between a Tx coil having a conventional coil structure in which only coil parts $N_1$ and $N_2$ other than the coil parts $N_3$ and $N_4$ in the structure of FIG. 6 are used, and an Rx coil having the structure such as that shown in FIG. 7, and show mutual inductances for case 1 (where the center of the Rx coil is moved from the position of the coordinates of FIG. 4A in a y direction) and case 2 (where the center of the Rx coil is moved from the position of the coordinates of FIG. 4A in an X direction). In FIG. 8, graphs c and d indicate mutual inductance between the Tx coil having the structure of FIG. 6 and the Rx coil having the structure of FIG. 7, and show mutual inductances for case 1 (where the center of the Rx coil is moved from the position of the coordinates of FIG. 4A in a y direction that is horizontal to a coil surface) and case 2 (where the center of the Rx coil is moved from the position of the coordinates of FIG. 4A in an x direction that is horizontal to the coil surface).

As shown in FIG. 8, when a distance ρ (rho) between the centers of two coils is changed in a charging zone that is a portion processed as a colored portion in graph a, a variation in mutual inductance is very large (e.g., (maximum mutual inductance−minimum mutual inductance)/maximum mutual inductance>0.2). However, in a charging zone in which a difference between the centers of the two coils is 4 cm or less, a variation in mutual inductance is very small (e.g., (maximum mutual inductance−minimum mutual inductance)/maximum mutual inductance<0.2) in graph c. It can be seen that when the distance deviates from the charging zone, mutual inductance rapidly decreases for all cases.

MODE FOR INVENTION

Figure 9:
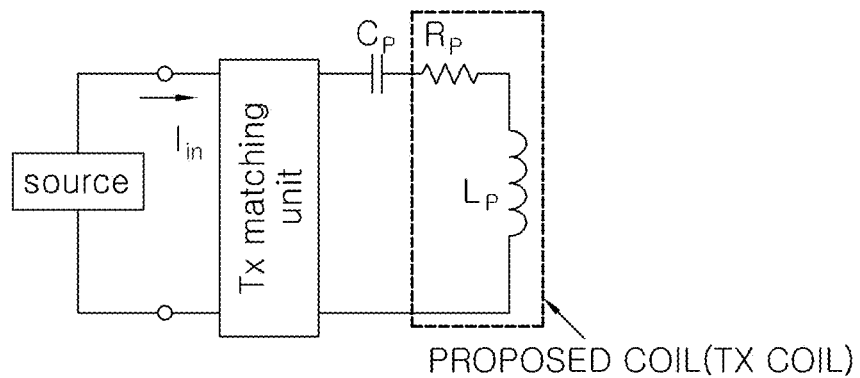
FIG. 9 is a diagram showing a configuration in which the proposed coil structure of FIG. 5 is applied to the transmitter of the wireless power transfer system according to an embodiment of the present invention.

FIG. 9 is a diagram showing a configuration in which the proposed coil structure such as that shown in FIG. 5 is applied to the transmitter of the wireless power transfer system according to an embodiment of the present invention.

As shown in FIG. 5, both ends of a coil proposed in the present invention and composed of four parts $N_1$, $N_2$, $N_3$, and $N_4$ having different radiuses $r_1$, $r_2$, $r_3$, and $r_4$ to have uniform mutual inductance according to an embodiment of the present invention may be connected to both ends of the impedance matching unit (Tx matching unit) of the transmitter, and thus the proposed coil may be used as a Tx coil. In this case, the entirety of the proposed coil that is the Tx coil may be equivalently implemented using resistance $R_p$ and inductance $L_p$, and a capacitor $C_p$ may be connected between one end of the proposed coil that is the Tx coil and one end of the impedance matching unit of the transmitter (Tx matching unit). $C_p$ is used to adjust a resonant frequency and perform impedance matching. In addition, the capacitor Cp may be connected in various connection shapes, such as connection between the end portion of the coil part $N_4$ and the start portion of the coil part $N_1$.

Figure 10:
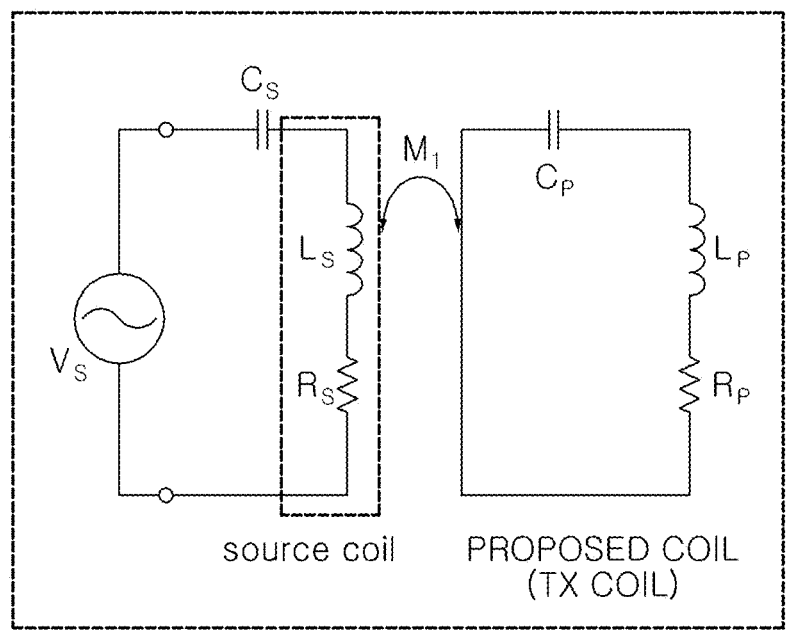
FIG. 10 is a diagram showing a detailed configuration in which the proposed coil structure of FIG. 5 is applied to the transmitter of the wireless power transfer system according to an embodiment of the present invention.

FIG. 10 is a diagram showing a detailed configuration in which the proposed coil structure such as that shown in FIG. 5 is applied to the transmitter of the wireless power transfer system according to an embodiment of the present invention.

As shown in FIG. 10, the transmitter is configured such that a source coil (indicated by self-inductance $L_s$ and resistance $R_s$ in an equivalent circuit) is connected between both ends of an AC source Vs (voltage source, current source, or power source), and a capacitor $C_s$ may be connected to one end of the source coil, and such that a proposed coil (indicated by self-inductance $L_p$ and resistance $R_p$ in an equivalent circuit) having a capacitor $C_p$, which is a transmitting (resonant) coil (Tx coil) coupled magnetically to the source coil, is provided.

The source coil and the transmitting (resonant) coil (Tx coil) are not directly connected and are coupled to each other via a magnetic field while being spaced apart from each other, and function as an impedance matching unit (Tx matching unit) by performing impedance matching via the adjustment of mutual inductance $M_1$ between the source coil and the transmitting (resonant) coil (Tx coil). Further, a capacitor $C_s$ between one end of the AC source Vs and one end of the source coil may be used for the resonance of the source coil with the Tx (resonant) coil (Tx coil), but it is not necessarily required.

Figure 11:
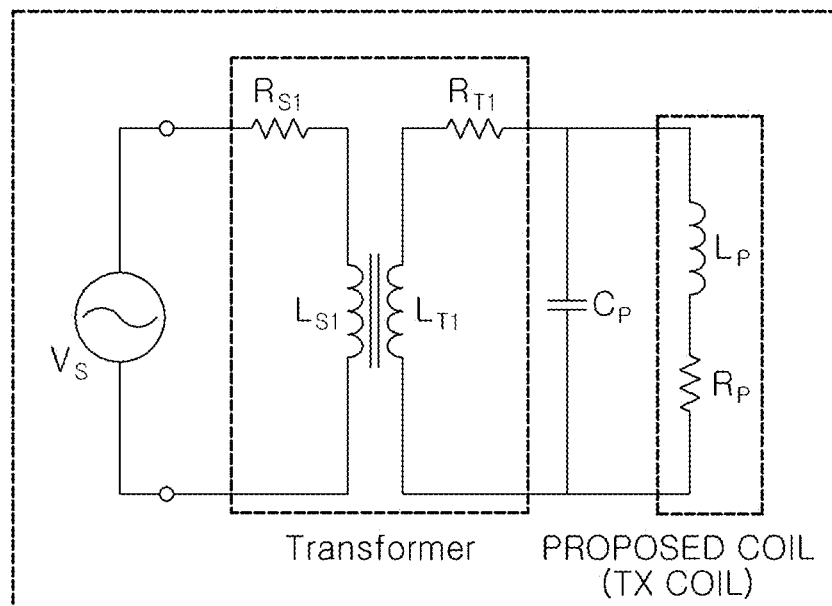
FIG. 11 is a diagram showing another detailed configuration in which the proposed coil structure of FIG. 5 is applied to the transmitter of the wireless power transfer system according to an embodiment of the present invention.

FIG. 11 is a diagram showing another detailed configuration in which the proposed coil structure such as that shown in FIG. 5 is applied to the transmitter of the wireless power transfer system according to an embodiment of the present invention.

As shown in FIG. 11, the transmitter is configured such that the primary side of a transformer (indicated by inductance $L_{S1}$ and resistance $R_{S1}$ in an equivalent circuit) is connected between both ends of an AC source Vs (voltage source, current source, or power source), and such that a Tx (resonant) coil (Tx coil) that is a proposed coil (indicated by self-inductance $L_p$ and resistance $R_p$ in an equivalent circuit)

having a capacitor $C_p$ connected between both ends of the proposed coil is provided on the secondary side of the transformer (indicated by self-inductance $L_{T1}$ and resistance $R_{T1}$ in an equivalent circuit). Here, the transformer functioning as an impedance matching unit (Tx matching unit) may have a structure in which primary side and secondary side coils are wound around an air core, or may have a structure in which primary side and secondary side coils are wound around a material containing a magnetic material, such as a ferrite core.

Figure 12:
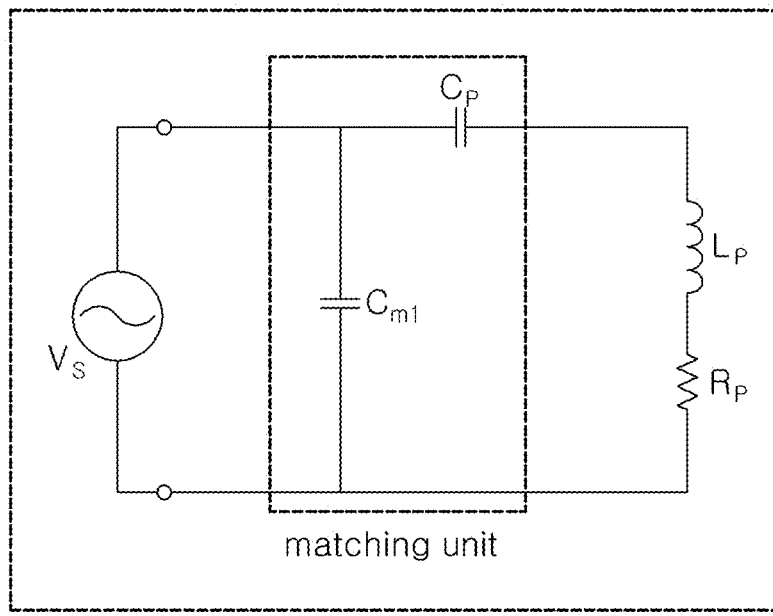
FIG. 12 is a diagram showing a further detailed configuration in which the proposed coil structure of FIG. 5 is applied to the transmitter of the wireless power transfer system according to an embodiment of the present invention.

FIG. 12 is a diagram showing a further detailed configuration in which the proposed coil structure such as that shown in FIG. 5 is applied to the transmitter of the wireless power transfer system according to an embodiment of the present invention.

As shown in FIG. 12, the transmitter is configured such that a capacitor $C_{m1}$ functioning as an impedance matching unit (Tx matching unit) is connected between both ends of an AC source Vs (voltage source, current source, or power source) and such that a proposed coil (indicated by self-inductance $L_p$ and resistance $R_p$ in an equivalent circuit) having a capacitor $C_p$ may be provided in parallel with the capacitor $C_{m1}$ as a Tx (resonant) coil (Tx coil).

Figure 13:
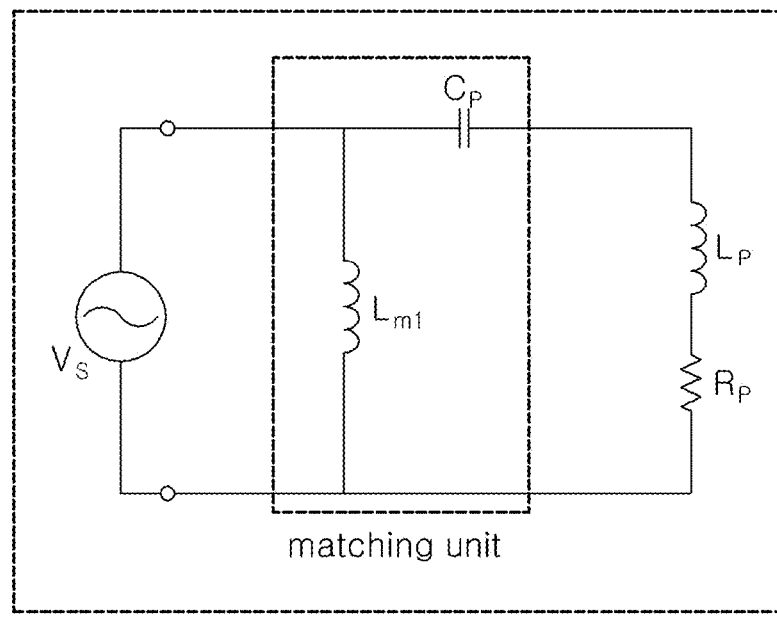
FIG. 13 is a diagram showing yet another detailed configuration in which the proposed coil structure of FIG. 5 is applied to the transmitter of the wireless power transfer system according to an embodiment of the present invention.

FIG. 13 is a diagram showing yet another configuration in which the proposed coil structure such as that shown in FIG. 5 is applied to the transmitter of the wireless power transfer system according to an embodiment of the present invention.

As shown in FIG. 13, the transmitter is configured such that an inductor $L_{m1}$ functioning as an impedance matching unit (Tx matching unit) is connected between both ends of an AC source Vs (voltage source, current source, or power source), and such that a proposed coil (indicated by self-inductance $L_p$ and resistance $R_p$ in an equivalent circuit) having a capacitor $C_p$ may be provided in parallel with the inductor $L_{m1}$ as a Tx (resonant) coil (Tx coil).

In addition to the methods of FIGS. 10 to 13 for impedance matching, matching circuits that exploit various types of coupling elements, such as a coil, a transformer, a capacitor, and an inductor, may be used.

Figure 14:
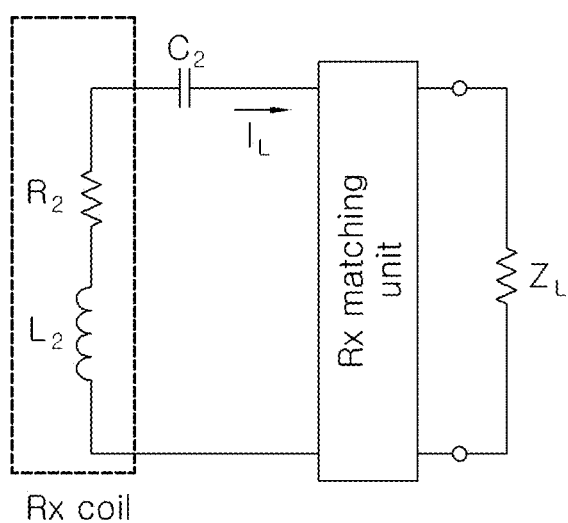
FIG. 14 is a diagram showing the configuration of the receiver of the wireless power transfer system according to an embodiment of the present invention.

FIG. 14 illustrates the configuration of the receiver of the wireless power transfer system according to an embodiment of the present invention. As described above, the coil structure such as that shown in FIG. 7 or the proposed coil structure such as that shown in FIG. 5 may be applied to the receiving (resonant) coil (Rx coil), which will be described later.

As shown in FIG. 14, the receiver includes an Rx (resonant) coil (Rx coil) (indicated by self-inductance $L_2$, resistance $R_2$, and capacitance $C_2$ in an equivalent circuit) of the receiver, coupled to a Tx (resonant) coil (Tx coil) via mutual inductance $M_{12}$, and a matching unit (Rx matching unit) for impedance matching connected between both ends of the Rx coil, and has a structure in which a load (impedance $Z_L$) is connected between both ends of the Rx matching unit to consume power. The load (impedance $Z_L$) may be a circuit for the charging of a battery or the operation of a device. $C_2$ is used to adjust the resonant frequency of the Rx coil and perform impedance matching of the Rx coil.

Figure 15:
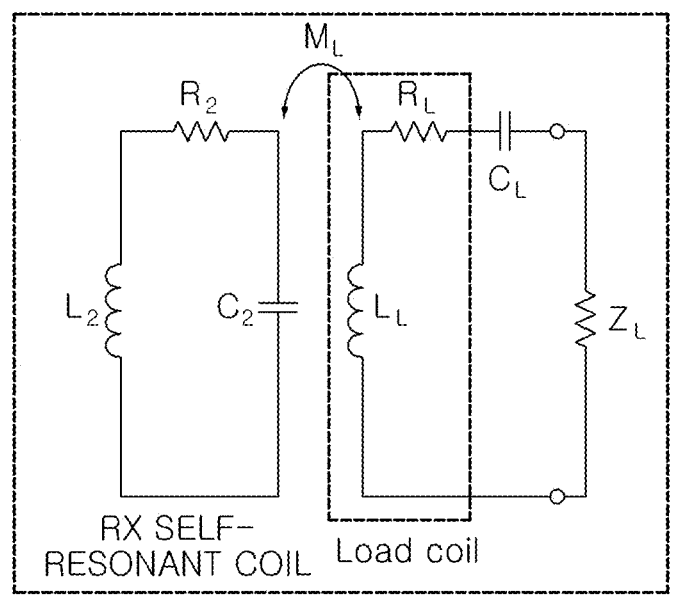
FIG. 15 is a diagram showing the detailed configuration of the receiver of the wireless power transfer system according to an embodiment of the present invention.

FIG. 15 is a diagram showing a detailed configuration of the receiver of the wireless power transfer system according to an embodiment of the present invention.

As shown in FIG. 15, the receiver includes an Rx (resonant) coil (Rx coil) (indicated by self-inductance $L_2$, resistance $R_2$, and capacitance $C_2$ in an equivalent circuit) that is an Rx self-resonant coil, and a load coil (indicated by self-inductance $L_L$ and resistance $R_L$ in an equivalent circuit) coupled to the Rx coil via magnetic coupling, and has a structure in which a capacitor $C_L$ may be connected to one end of the load coil and a load (impedance $Z_L$) is connected between both ends of the load coil (or between both ends of the load coil after passing through the capacitor $C_L$) to consume power. The capacitor $C_L$ between one end of the load coil and one end of the load (impedance $Z_L$) may be used to adjust the resonant frequency of the load coil and the source coil or perform impedance matching of the load coil, but it is not necessarily required and may be omitted according to the circumstances. Here, by performing impedance matching via the adjustment of mutual inductance $M_L$ between the Rx (resonant) coil (Rx coil) and the load coil, the Rx coil and the load coil may function as an impedance matching unit (Rx matching unit).

Figure 16:
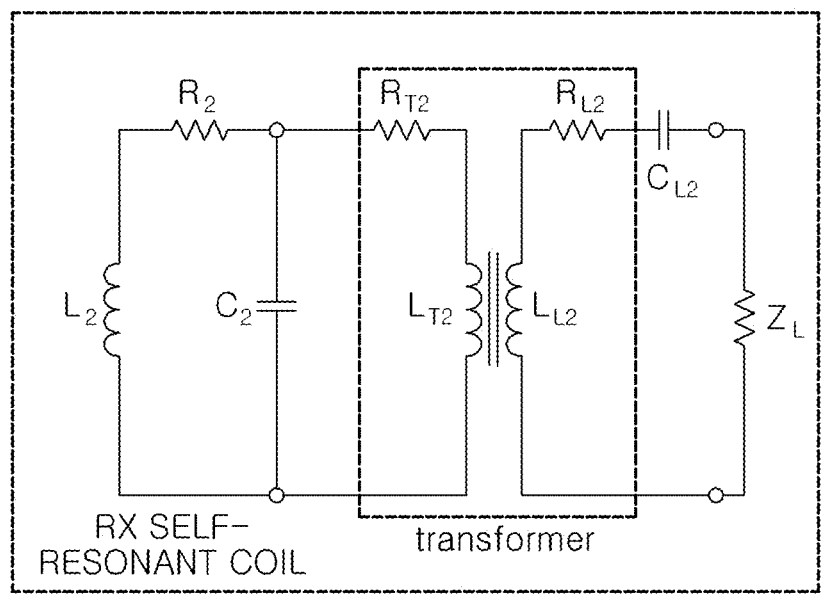
FIG. 16 is a diagram showing another detailed configuration of the receiver of the wireless power transfer system according to an embodiment of the present invention.

FIG. 16 illustrates another detailed configuration of the receiver of the wireless power transfer system according to an embodiment of the present invention.

As shown in FIG. 16, the receiver is configured such that a primary side of a transformer (indicated by self-inductance $L_{T2}$ and resistance $R_{T2}$ in an equivalent circuit) is connected between both ends of an Rx (resonant) coil (Rx coil) (indicated by self-inductance $L_2$, resistance $R_2$, and capacitance $C_2$ in an equivalent circuit) that is a Rx self-resonant coil, and such that a load (impedance $Z_L$) is connected between both ends of a secondary side of the transformer (indicated by self-inductance $L_{L2}$ and resistance $R_{L2}$ in an equivalent circuit) (or between both ends of the secondary side after passing through a capacitor $C_{L2}$) to consume power. The capacitor $C_{L2}$ between one end of the secondary side of the transformer and one end of the load (impedance $Z_L$) may be used for impedance matching, but it is not necessarily required and may be omitted according to the circumstances. Here, the transformer functioning as an impedance matching unit (Rx matching unit) may have a structure in which primary and secondary side coils are wound around an air core or may have a structure in which primary side and secondary side coils are wound around a material containing a magnetic material, such as a ferrite core.

Figure 17:
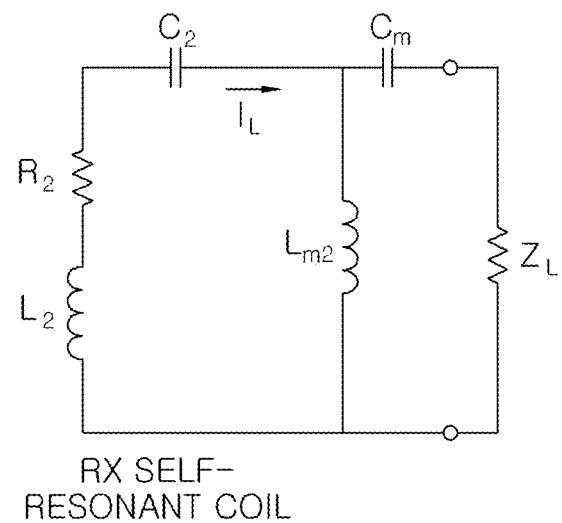
FIG. 17 is a diagram showing a further detailed configuration of the receiver of the wireless power transfer system according to an embodiment of the present invention.

FIG. 17 illustrates a further detailed configuration of the receiver of the wireless power transfer system according to an embodiment of the present invention.

As shown in FIG. 17, the receiver is configured such that an inductor $L_{m2}$ functioning as an impedance matching unit (Rx matching unit) is connected between both ends of an Rx (resonant) coil (Rx coil) (indicated by self-inductance $L_2$, resistance $R_2$, and capacitance $C_2$ in an equivalent circuit) that is an Rx self-resonant coil, and such that a load (impedance $Z_L$) is connected between both ends of the inductor $L_{m2}$ (or both ends of the inductor $L_{m2}$ after passing through a capacitor $C_m$) to consume power. The capacitor $C_m$ between one end of the inductor $L_{m2}$ and one end of the load (impedance $Z_L$) may be used for impedance matching, but it is not necessarily required and may be omitted according to the circumstances.

Figure 18:
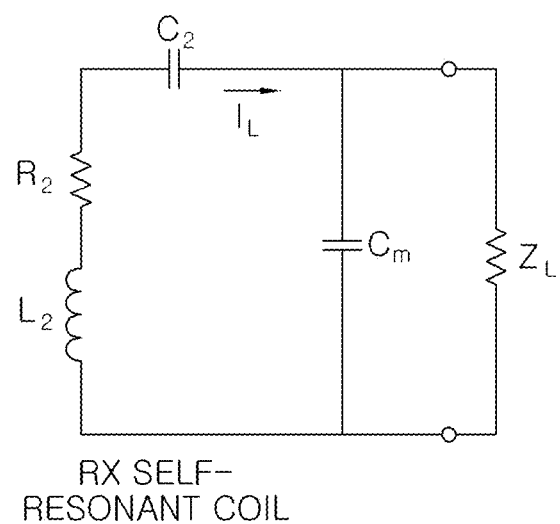
FIG. 18 is a diagram showing yet another detailed configuration of the receiver of the wireless power transfer system according to an embodiment of the present invention.

FIG. 18 illustrates yet another detailed configuration of the receiver of the wireless power transfer system according to an embodiment of the present invention.

As shown in FIG. 18, the receiver is configured such that a capacitor $C_m$ functioning as an impedance matching unit (Rx matching unit) is connected between both ends of an Rx resonant coil (indicated by self-inductance $L_2$, resistance $R_2$, and capacitance $C_2$ in an equivalent circuit) that is an Rx self-resonant coil, and such that a load (impedance $Z_L$) is connected between both ends of the capacitor $C_m$ to consume power.

Figure 19:
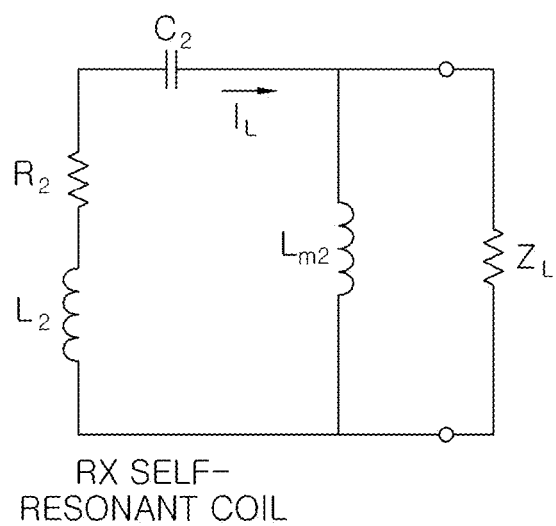
FIG. 19 is a diagram showing still another detailed configuration of the receiver of the wireless power transfer system according to an embodiment of the present invention.

FIG. 19 is a diagram showing still another detailed configuration of the receiver of the wireless power transfer system according to an embodiment of the present invention.

As shown in FIG. 19, the receiver is configured such that an inductor $L_{m2}$ functioning as an impedance matching unit (Rx matching unit) is connected between both ends of an Rx (resonant) coil (Rx coil)(indicated by self-inductance $L_2$, resistance $R_2$, and capacitance $C_2$ in an equivalent circuit) that is an Rx self-resonant coil, and such that a load (impedance $Z_L$) is connected between both ends of the inductor $L_{m2}$ to consume power. This illustrates a case where the capacitor $C_m$ is omitted from the structure of FIG. 17.

Figure 20:
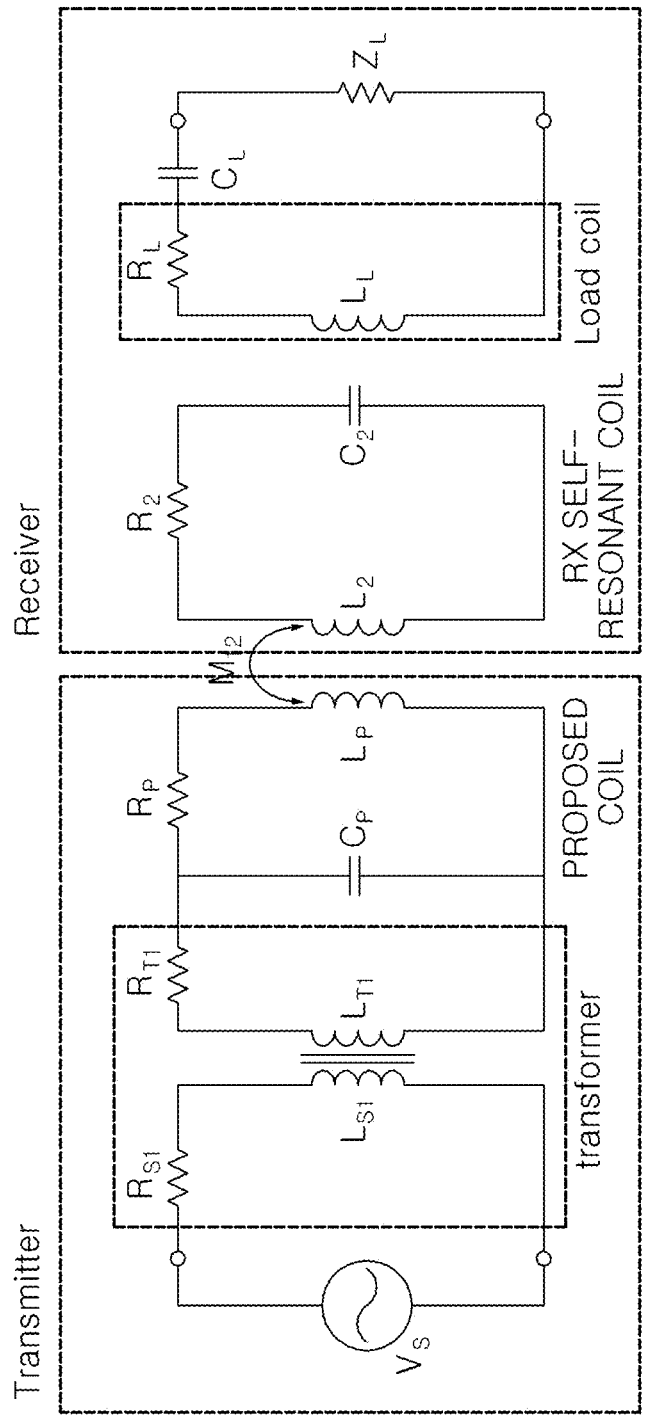
FIG. 20 is a diagram illustrating a case where the structures of FIGS. 11 and 15 are coupled to each other.

FIG. 20 illustrates a case where the structures of FIGS. 11 and 15 are coupled to each other.

As shown in FIG. 20, the transmitter is configured such that the primary side of a transformer (indicated by inductance $L_{S1}$ and resistance $R_{S1}$ in an equivalent circuit) is connected between both ends of an AC source Vs (voltage source, current source, or power source), and such that a Tx (resonant) coil (Tx coil) that is a proposed coil (indicated by self-inductance $L_p$ and resistance $R_p$ in an equivalent circuit) having a capacitor $C_p$ connected between both ends of the proposed coil is provided on the secondary side of the transformer (indicated by self-inductance $L_{11}$ and resistance $R_{T1}$ in an equivalent circuit). Here, the transformer functioning as an impedance matching unit (Tx matching unit) may have a structure in which primary side and secondary side coils are wound around an air core, or may have a structure in which primary side and secondary side coils are wound around a material containing a magnetic material, such as a ferrite core.

Further, the receiver includes an Rx (resonant) coil (Rx coil) thereof (indicated by self-inductance $L_2$, resistance $R_2$, and capacitance $C_2$ in an equivalent circuit) coupled to the Tx (resonant) coil (Tx coil) via mutual inductance $M_{12}$, and a load coil (indicated by self-inductance $L_L$ and resistance $R_L$ in an equivalent circuit) coupled to the Rx coil via magnetic coupling, and has a structure in which a capacitor $C_L$ may be connected to one end of the load coil and a load (impedance $Z_L$) is connected between both ends of the load coil (or between both ends of the load coil after passing through the capacitor $C_L$) to consume power. The capacitor $C_L$ between the load coil and the load (impedance $Z_L$) may be used to adjust the resonant frequency of the load coil and the source coil or perform impedance matching of the load coil, but it is not necessarily required and may be omitted according to the circumstances. Here, by performing impedance matching via the adjustment of mutual inductance $M_L$ between the Rx (resonant) coil (Rx coil) and the load coil, the Rx coil and the load coil may function as an impedance matching unit (Rx matching unit).

As described above, the near-field wireless power transfer system according to the present invention enables free positioning in which the receiver and the transmitter are freely arranged so that the centers thereof can be horizontally and relatively moved within a wireless power transmission distance having a uniform mutual inductance of 20% or less through the use of a single coil without requiring a separate additional circuit, as shown in FIG. 8. Further, the near-field wireless power transfer system is configured such that multiple devices with relative center positions thereof located at horizontally different positions simultaneously receive power in a wireless manner via their Rx coils, thus enabling power for the operations of respective devices or the charging of the devices to be supplied. The present invention also applies to the cases with a change in vertical position within a predetermined distance.

That is to say, when a mutual inductance is uniform between the Rx coil and the Tx coil which are spaced apart by a predetermined distance, the mutual inductance is uniform within the charging area beyond the predetermined distance.

In designing an optimal impedance matching circuit for maximum power transmission reflecting on variations of the distance between the Rx coil and the Tx coil, this eliminate the need of impedance matching depending on the positions of the Rx coil and the Tx coil within the charging area, and only the impedance matching depending on the variations of distance of the Rx coil and the Tx coil may suffice.

In this way, there is no need to use an adaptive impedance matching circuit depending on the change in the position between the transmitter and receiver, thus decreasing the complexity of the system and enabling the system to be configured at low costs.

The coil structure having uniform mutual inductance may be present in various shapes. In particular, the coil structure, such as that shown in FIG. 5 proposed in the present invention, uses a plurality of series-connected coils, and the respective coils $N_1$, $N_2$, $N_3$, and $N_4$ may be connected at equal or unequal intervals. Further, there is a structure in which a plurality of coils are arranged in parallel with each other, and such a parallel-connected structure may include coils through which current flows in a direction opposite to that of input current, or coils through which current flows in a direction identical to that of the input current. Although the arrangement of such coils $N_1$, $N_2$, $N_3$, and $N_4$ has been illustratively shown in FIGS. 5 and 6, the arrangement of the coils is not limited to such a specific arrangement, and the coils $N_1$, $N_2$, $N_3$, and $N_4$ may be arranged at any positions.

Figure 21:
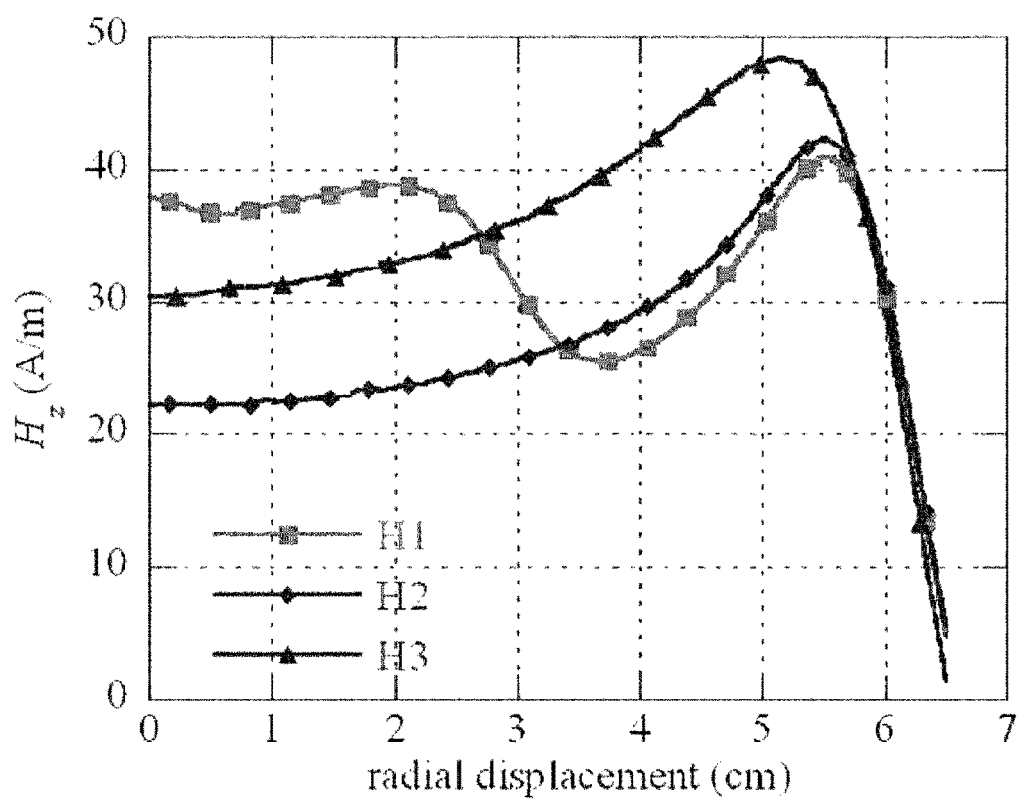
FIG. 21 is a diagram showing variations in magnetic fields in the proposed coil structure of FIG. 5, a structure in which $N_3$ and $N_4$ are removed from the structure of FIG. 5, and a structure in which only $N_4$ is removed from the structure of FIG. 5.

By means of the coil structure, a magnetic field in a weak magnetic field portion (center portion in the proposed coil structure) is increased, and thus mutual inductance may be maintained so that a predetermined range around the coil structure (within a predetermined distance from the center), for example, a condition of [(maximum mutual inductance−minimum mutual inductance)/maximum mutual inductance] <0.2, is satisfied on the whole. This is realized by adjusting the arrangement of coils, rather than changing the shapes of the coils. This was proved, as shown in FIG. 21, from the results of simulation. That is, FIG. 21 illustrates the results of simulation of magnetic fields ($H_z$) at positions higher than the respective coil structures $H_1$, $H_2$, and $H_3$ by a height of 1 cm, wherein graph $H_3$ shows results obtained when $N_3$ and $N_4$ are removed from the structure of FIG. 5, graph $H_2$ shows results obtained when $N_4$ is removed from the structure of FIG. 5, and graph $H_1$ shows results obtained from the structure of FIG. 5 without change. As can be seen from FIG. 21, $H_2$ and $H_3$ indicate a large difference between a magnetic field at the center (radial displacement, rho=0) and a magnetic field at a position where the center of the corresponding coil is horizontally moved in a y direction by 5 cm, but $H_1$ indicates that a magnetic field is very strong at the center, and decreases and then increases depending on the positions horizontally moving in the y direction. As shown in FIG. 21, a magnetic field in a circumferential portion in which a magnetic field is weaker than that of the center may be reduced in the case of $H_1$ compared to $H_2$ or $H_3$. However, this is an exemplary result, and the magnetic field in the circumferential portion may be increased or decreased depending on the arrangement status of the coils $N_1$, $N_2$, $N_3$, and $N_4$, the number of turns of the coils, or the like.

By utilizing the coil structure having uniform mutual inductance, uniform mutual inductance or FoM is obtained even if the mutual positions of the transmitter and the receiver are changed, and thus only an impedance matching circuit suitable for preset mutual inductance needs to be configured in the transmitter and the receiver. That is, there is no need to change suitable impedance matching depending on the positions of the transmitter and the receiver. As shown in FIGS. 9 to 20, the impedance matching circuit has various configurations.

Further, as in the case where respective receivers of multiple devices with relative center positions thereof located at horizontally different positions (permitting a change in vertical position within a predetermined distance) simultaneously receive power in a wireless manner via their Rx coils, when multiple loads are present, the input impedance $Z_{in}$ of the transmitter may differ depending on the number and positions of the Rx coils, but impedance matching may be easily implemented by applying the Tx coil having uniform mutual inductance as in the case of the present invention.

For example, since input impedance $Z_{in}$ is changed depending on the number of receivers or Rx coils for such multiple loads, the system is simply implemented so that the transmitter performs impedance matching by sensing a variation in loads depending on the change in the number of receivers or Rx coils via an input impedance ($Z_{in}$) sensing circuit (not shown) or voltage and/or current sensing circuit (not shown) and by adjusting the input impedance $Z_{in}$ depending on only the number of multiple loads (receivers or Rx coils) regardless of the positions of the multiple loads.

Further, by inserting a separate Tx coil as shown in FIG. 10, the Tx coil is suitably designed to always have high efficiency even for the maximum number of loads and the number of loads below the maximum number, thus realizing impedance matching for multiple devices.

As in the case of the prior art, in a conventional non-uniform mutual inductance structure which does not have uniform mutual inductance, individual receivers have different mutual inductance values and have a large variation in mutual inductance, and thus a problem arises in that multiple loads cannot be supported by a single transmitter. However, the present invention simply senses a variation in loads depending on the number of loads via an input impedance ($Z_1$) sensing circuit (not shown), and realizes impedance matching by controlling the resistance value, inductance value or capacitance value of the impedance matching unit (Tx matching unit) of the transmitter so that input impedance is adjusted in conformity with the sensed load variation, thus enabling wireless power to be transmitted/received at maximum power transfer efficiency η. The control of the resistance value, inductance value or capacitance value of the impedance matching unit (Tx matching unit) may be performed by controlling switching means (e.g., a Metal-Oxide Semiconductor Field Effect Transistor (MOSFET), a Bipolar Junction Transistor (BJT), a Silicon Controlled Rectifier (SCR), a thyristor, or the like) so that a separate resistor, inductor, or capacitor is added to or removed from a circuit.

As described above, although the present invention has been described with reference to limited embodiments and drawings, the present invention is not limited by the embodiments, and may be changed and modified in various forms by those skilled in the art to which the present invention pertains from the description of the embodiments. Therefore, the scope of the present invention should not be limited and defined by the above-described embodiments, and should be defined by the accompanying claims and equivalents thereof.

The invention claimed is:

1. A wireless power transfer system for transmitting and receiving power between a transmitting coil of a transmitter and a receiving coil of a receiver via magnetic coupling, wherein:
   the transmitting coil and the receiving coil are configured such that center positions thereof are arranged at horizontally different positions to implement wireless power transfer in a way of horizontally free positioning, and are configured to transmit and receive power in a wireless manner via a uniform mutual inductance within a preset range between the transmitting coil and the receiving coil,
   wherein the preset range satisfies the equation (Max*MI*–Min*MI*)/Max*MI*<0.2, wherein MaxMI is a maximum mutual inductance of the preset range and MinMI is a minimum mutual inductance of the preset range.

2. The wireless power transfer system of claim 1, wherein multiple devices placed at horizontally different positions simultaneously charge batteries thereof using the uniform mutual inductance via receiving coils of corresponding receivers.

3. The wireless power transfer system of claim 1, wherein the transmitter further comprises:
   a unit for adjusting input impedance matching of the transmitter depending on multiple loads placed at horizontally different positions; and
   a sensing circuit for sensing a variation in an input impedance looking into the transmitting coil depending on the multiple loads and controlling the unit, thus performing the input impedance matching for the multiple loads.

4. The wireless power transfer system of claim 1, wherein:
   the transmitter comprises a unit for input impedance matching of the transmitter between an Alternating Current (AC) source and the transmitting coil, and
   the input impedance matching is possible via the unit within a range of a maximum number of multiple loads to be placed at horizontally different positions.

5. The wireless power transfer system of claim 4, wherein a source coil connected to the AC source is separated from the transmitting coil via magnetic coupling, and the input impedance matching is possible regardless of a variation in the maximum number of multiple loads by changing mutual inductance between the source coil and the transmitting coil according to a design of the transmitting coil.

6. A coil assembly, comprising:
   a first coil part through which current flows in a direction of input current applied from a first end of the coil assembly, the first coil part being disposed between the first end and a second end of the coil assembly; and
   a second coil part connected to the first coil part through which current flows in the direction of the input current, the second coil part being concentrically formed with the first coil part and configured such that current flows in a direction opposite to that of the input current,
   wherein the coil assembly transfers wireless power depending on mutual inductance with respective target coils, relative center positions of which are horizontally different from each other.

7. The coil assembly of claim 6, wherein the target coils comprise either a single coil, a relative center position of which is horizontally movable, or multiple coils, relative center positions of which are located at horizontally different positions.

8. The coil assembly of claim 6, wherein the coil assembly is configured such that a magnetic field in a center of the coil assembly is relatively increased to have uniformity in mutual inductance with another coil.

9. The coil assembly of claim 6, wherein coils constituting the coil assembly are formed using a Printed Circuit Board (PCB) manufacturing process or a semiconductor manufacturing process, and the coils formed to be distributed and arranged on multiple layers are connected to each other through via holes.

10. The coil assembly of claim 6, wherein the first coil part and the second coil part of the coil assembly are wound in shapes of concentric circles or concentric polygons.

11. The coil assembly of claim 6, wherein the first coil part through current flows in the direction of the input current includes a coil part concentrically wound multiple times towards a center thereof so that current flows in the direction of the input current.

12. The coil assembly of claim 6, wherein the second coil part through which the current flows in the direction opposite to that of the input current comprises a coil part in which two or more coils are connected in parallel and wound so that current flows in a direction opposite to that of the input current.

13. The coil assembly of claim 12, wherein the coil part in which two or more coils are connected in parallel is wound one or more times.

14. The coil assembly of claim 12, wherein the coil part comprises two coils connected in parallel and input current I0 of the coil part is divided into $\alpha$I0 and $(1-\alpha)$I0 through the two coils, wherein $\alpha$ is any number of which absolute value is equal to or less than 2.

15. A coil assembly, comprising:
a coil part through which current flows in a direction of input current applied from a first end of the coil assembly, the coil part being disposed between the first end and a second end of the coil assembly,
wherein the coil part comprises:
a first coil part concentrically wound one or more times towards a center thereof so that current flows in a direction of the input current; and
a second coil part, a center of which is aligned with that of the first coil part and in which two or more coils are connected in parallel and are concentrically wound so that current flows in the direction of the input current, and
wherein the coil assembly transfers wireless power via magnetic coupling with respective target coils, relative center positions of which are horizontally different from each other.

16. The coil assembly of claim 15, wherein the second coil part in which two or more coils are connected in parallel and are concentrically wound is wound one or more times.

17. The coil assembly of claim 16, wherein the second coil part comprises two coils connected in parallel and input current I0 of the second coil part is divided into $\alpha$I0 and $(1-\alpha)$I0 through the two coils, wherein $\alpha$ is any number of which absolute value is equal to or less than 2.

18. The coil assembly of claim 15, further comprising a third coil part in which two or more coils are connected in parallel and are concentrically wound so that current flows in a direction opposite to that of the input current.

19. The coil assembly of claim 18, wherein the third coil part comprises two coils connected in parallel and input current I0 of the third coil part is divided into $\beta$I0 and $(1-\beta)$I0 through the two coils, wherein $\beta$ is any number of which absolute value is equal to or less than 2.

20. A wireless power transfer system for transmitting/receiving power between a transmitting coil of a transmitter and a receiving coil of a receiver via magnetic coupling, wherein the transmitting coil or the receiving coil comprises:
a first coil part concentrically wound one or more times towards a center thereof so that current flows in a direction of an input current applied from a first end of the transmitting coil or the receiving coil, the first coil part being disposed between the first end and a second end of the transmitting coil or the receiving coil; and
a coil part A connected to the first coil part in which the current flows in the direction of the input current, the coil part A having a center aligned with that of the first coil part and being concentrically arranged with the first coil part, the coil part A being configured such that, in the coil part A, current flows in a direction opposite to that of the input current; or
a coil part B having a center aligned with that of the first coil part, the coil part B being configured such that two or more coils are connected in parallel and are concentrically wound so that, in the coil part B, current flows in a same direction of the input current,
wherein the transmitting coil transmits power to one or more receiving coils, relative center positions of which are horizontally different from each other.

21. The wireless power transfer system of claim 20, wherein uniform mutual inductance within a preset range is obtained between each of the receiving coils and the transmitting coil.

22. The wireless power transfer system of claim 21, wherein the power is transferred because of the uniform mutual inductance, without changing impedance matching regardless of variations of the horizontal position of the transmitter or the receiver.

23. The wireless power transfer system of claim 20, wherein the transmitter comprises means for impedance matching to the transmitting coil between an Alternating Current (AC) source (Vs) and the transmitting coil.

24. The wireless power transfer system of claim 23, wherein the transmitter comprises a sensing circuit for sensing a variation in impedances of loads depending on a number of receiving coils, and performs impedance matching by controlling the means for impedance matching so that input impedance is adjusted depending on the variation in the impedances of the loads sensed by the sensing circuit.

25. The wireless power transfer system of claim 20, wherein the transmitter comprises a source coil connected to an AC source that is a voltage source, current source or power source, and separated from and magnetically coupled to the transmitting coil without being directly connected to the transmitting coil, and performs impedance matching via mutual inductance between the source coil and the transmitting coil.

26. The wireless power transfer system of claim 20, wherein the transmitter comprises a transformer for impedance matching, a primary side of which is connected to an AC source that is a voltage source, current source or power source, and a secondary side of which is connected to the transmitting coil.

27. The wireless power transfer system of claim 20, wherein the transmitter comprises a capacitor for impedance matching connected between the transmitting coil and an AC source that is a voltage source, current source, or a power source.

28. The wireless power transfer system of claim 27, wherein the capacitor is connected in parallel or in series with the transmitting coil.

29. The wireless power transfer system of claim 28, wherein another capacitor is connected in series with the AC source when the capacitor is connected in parallel with the transmitting coil.

30. The wireless power transfer system of claim 28, wherein another capacitor is connected in parallel with the AC source when the capacitor is connected in series with the transmitting coil.

31. The wireless power transfer system of claim 20, wherein the transmitter comprises an inductor for impedance matching connected between the transmitting coil and an AC source that is a voltage source, current source, or power source.

32. The wireless power transfer system of claim 31, wherein the inductor is connected in parallel with the transmitting coil.

33. The wireless power transfer system of claim 32, wherein a capacitor is connected in series between the AC source and the inductor.

34. The wireless power transfer system of claim 20, wherein the receiver comprises means for impedance matching for a load, the means being arranged between the receiving coil and the load.

35. The wireless power transfer system of claim 20, wherein the receiver comprises a load coil connected to a load and magnetically coupled to the receiving coil without being directly connected to the receiving coil, and performs impedance matching by adjusting mutual inductance between the receiving coil and the load coil.

36. The wireless power transfer system of claim 35, wherein the receiver further comprises a capacitor arranged between a first end of the load coil and a first end of the load.

37. The wireless power transfer system of claim 20, wherein the receiver comprises a transformer for impedance matching, a primary side of which is connected to the receiving coil and a secondary side of which is connected to a load.

38. The wireless power transfer system of claim 20, wherein the receiver comprises an inductor or a capacitor for impedance matching between a load and the receiving coil.

39. The wireless power transfer system of claim 38, further comprising a capacitor arranged between a first end of the inductor and a first end of the load.

* * * * *